United States Patent Office 2,867,510
Patented Jan. 6, 1959

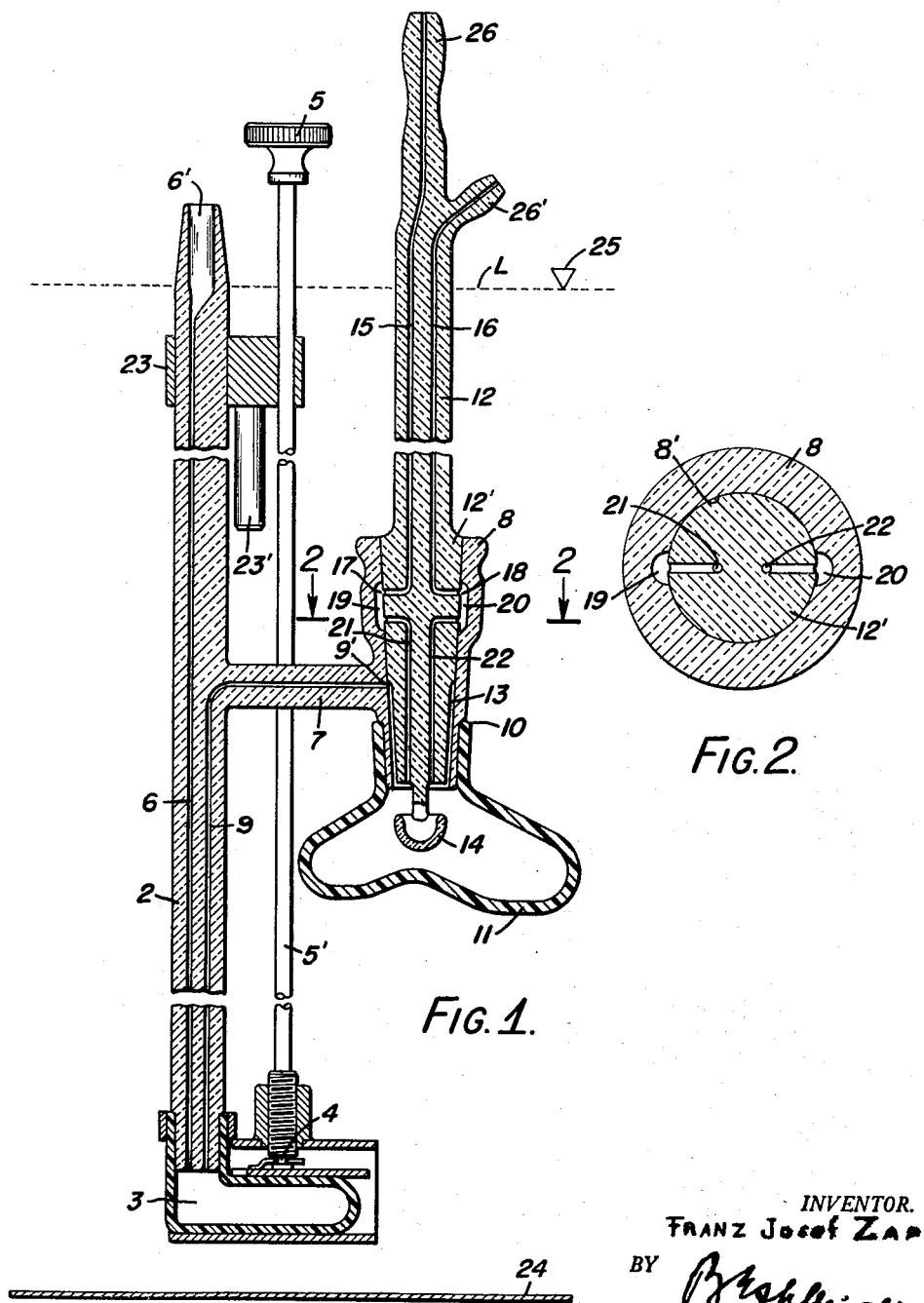

2,867,510

MANOMETRIC APPARATUS

Franz Josef Zapp, Homburg (Saar), Saarland, assignor, by mesne assignments, to Will Corporation, Rochester, N. Y., a corporation of New York Application November 5, 1956, Serial No. 620,485

10 Claims. (Cl. 23—253)

The present invention relates to apparatus for measuring the pressure of gases and vapors.

It is known that the respiration of tissue sections, of bacteria suspensions, and of small living creatures, and the quantities of gas bound or freed by a chemical reaction can be determined with a so-called Warburg apparatus.

The determination of the very small changes in gas volume is made through observation of the changes in pressure in a closed reaction system. With known working temperatures which must be held constant during the experiment, and with known volumes in the reaction system, the change in pressure is directly a measure of the gas development or of the gas consumption in the reaction system.

The total volume of the reaction vessel varies in known apparatus between five milliliters and one hundred and twenty milliliters. In conventional Warburg apparatus, a plurality of these reaction vessels are arranged in a constant temperature bath to hold constant the temperature of the gas and also of the material under test. In order to attain the quickest possible and most active diffusion, and a good gas interchange, these vessels must be shaken during the investigation. Each of these vessels usually is connected directly with a liquid capillary manometer by a ground glass joint; and the manometer is secured on a frame disposed outside the bath. Each reaction vessel is rigidly connected to its manometer by glass tubing that includes the ground glass joint; and the frame, on which the manometers are mounted, is shaken so that the manometers move as the reaction vessels are shaken in the bath.

The gas space of the capillaries, which connect the reaction vessel and the manometer, as well as the gas column above the manometer liquid in the arm connected with the reaction vessel, is in all hitherto-known apparatus not submerged in the constant temperature bath, and is therefore subjected to variations in ambient temperature.

So long as the gas space in the reaction vessel is large in proportion to the gas space in the connecting capillaries, and so long as the change in the quantity of the gas to be measured is large as compared with the temperature-produced changes in volume of the gas in the manometer and connecting capillaries, the error naturally is negligible.

Since the sensitivity of the pressure-measuring methods, or the corresponding manometric indications of change in gas quantity is, however, very strongly dependent on the size of the gas space in the reaction vessel, limits have been set by the theory of these methods, which postulate that the volume of the connecting capillaries and the volume of the reaction vessel itself should be a certain ratio for optimum results.

As an example let the proportions of a normal Warburg apparatus be assumed to be:

Gas space in the reaction vessel, about 15 milliliters.
Gas space in the exposed connecting capillary and in the capillary of the manometer, about 0.5 milliliter.
Temperature constancy of the uniform temperature bath, about ±0.01° C.

The temperature variations in the exposed capillaries may therefore be approximately thirty times larger than the temperature fluctuations of the constant temperature bath. Since the temperature fluctuations for the reaction vessel and for the capillaries can be in different directions, errors may be cumulative.

Heretofore satisfactory accuracy has been attainable with a ratio in volume between the volume in the exposed capillaries and the volume of the reaction vessel of about 1:30. It can be seen that with a reduction of about 1 to 2 milliliters in the volume of the gas in the reaction vessel, as may occur during an investigation that produces very small changes in gas quantity, a change of the above-mentioned ratio in volumes will produce a disturbing influence on the accuracy.

This invention relates to an apparatus of special construction in which the reaction vessel and the manometer are submerged in the constant temperature bath. The reading of the manometer is made in this case through the glass wall of the constant temperature bath.

The apparatus of the invention consists essentially of a manometer and of a reaction vessel and is characterized by the fact that the manometer and the reaction vessel are connected through a ground joint which consists of a ground sleeve and a ground stopper. On the inside of the ground sleeve there are provided two diametrically-opposed grooves or channels of limited radial and axial extent, and in the ground stopper there are provided two unconnected pairs of capillaries, an upper pair and a lower pair. The capillaries of the lower pair are connected with the reaction vessel and terminate at the lower end of the stopper, and at their upper ends open radially of the stopper at positions where each can open into one of the grooves or channels in the sleeve, when the stopper is properly oriented. The upper pair of capillaries open at their lower ends radially of the stopper so they also can open into the grooves or channels in the sleeve, simultaneously with the lower pair of capillaries, when the stopper is properly oriented. At their upper ends these upper capillaries terminate in two diverging nipples that are mounted on an extension of the ground stopper. The reaction vessel is provided with an inside joint that is secured on an outside ground surface provided on the lower end of the sleeve, so the reaction vessel communicates with the bore of the sleeve.

With this apparatus the total gas space, both that of the connecting capillaries and that of the reaction vessel, is submerged in the constant temperature bath. Thereby a constant temperature is maintained for the entire piece of apparatus. Also, a plurality of similar pieces of apparatus can be submerged in a single bath equally well. A reduction of the above-mentioned ratio in volume with the aim of increasing the sensitivity of the apparatus means now, therefore, no corresponding disturbing increase of the error caused by ambient temperature fluctuations.

The connecting capillaries between the manometer and the reaction vessel can with this arrangement be made considerably shorter, since now it is no longer necessary to bridge over the wall of the bath. This is an important advantage.

One embodiment of apparatus built according to the present invention is illustrated in the accompanying drawings, and will be described further hereinafter.

In the drawings:

Fig. 1 is an axial section showing diagrammatically a manometer and a reaction vessel for manometric measurements that are constructed according to one embodiment of the present invention; and Fig. 2 is a section taken on the line 2—2 of Fig. 1 looking in the direction of the arrows.

Referring now to the drawings by numerals of reference, 2 denotes the manometer which is a fluid pressure manometer, preferably a double capillary manometer such as is disclosed in German Patent No. 861,474. The two capillaries communicate at their lower ends with a squeezable rubber sack 3 which is preferably angular in shape. This sack can be compressed with the aid of the squeezing device 4 carried by the shaft 5', which is manipulable by the knob 5 in order to change the liquid level in the manometer or to hold the volume of the reaction vessel constant despite changes in pressure.

One leg or capillary 6 of the manometer is open to atmosphere and at the upper end of the manometer is provided with an enlargement 6', which serves for collecting the manometer fluid when there are large fluctuations in pressure. The manometer is provided at a point intermediate its height with a side arm 7 with which there is integrally formed a sleeve 8, that has a bore that has a ground inside surface 8'. The other leg or capillary 9 of the manometer extends through the arm 7 and opens at its upper end at 9' into the bore of the sleeve 8.

The sleeve 8 has at its lower end an outside ground surface 10 over which the reaction vessel 11 is pushed, and on which it is secured in known manner.

The bore 8' of the sleeve 8 is tapered, being of least diameter at its lower end. Mounted in the bore 8' of the sleeve 8 is a stopper 12 which tapers in diameter corresponding to the taper of the bore 8' of the sleeve 8. The lower portion of the bore 8' of the sleeve 8 is recessed; and between this lower portion of the bore of the sleeve and the lower part of the stopper, there is thus formed a clearance space 13 which connects the capillary 9 and the reaction vessel 11.

The stopper 12 is provided on its lower end with a small cup 14 for reception of caustic soda which serves for the absorption of the carbon dioxide freed by the respiration. Instead of this cup 14 there can be substituted a glass bulb in order to diminish the gas volume of the reaction vessel for the purpose of increasing sensitivity.

The stopper 12 projects at its upper end, like the upper end of the manometer rod, above the level L of the liquid in the constant temperature bath. There are two capillaries 15 and 16 provided in the upper portion of the stopper 12. At their lower ends, these two capillaries have right angular extensions which terminate at 17 and 18, respectively, at the bore 8' of the sleeve 8. The stopper 12 also is provided with two capillaries 21 and 22 which extend from its lower face upwardly to points just below the points of termination 17 and 18 of the capillaries 15 and 16. These two lower capillaries 21 and 22 also have right angular portion terminating in the bore of the sleeve 8. The sleeve 8 is provided with two diametrically-opposed recesses or grooves 19 and 20, which are of sufficient axial extent to overlap the terminal ends of the capillaries 15, 16, 21, and 22, when the stopper is in the position shown in Fig. 1. The stopper is, however, rotatable in the sleeve 8, and can be turned 90° from the position shown in Fig. 1 to shut off communication between the capillaries 15, 16, 21, and 22.

The capillary system 15, 16, 17, 18, 19, 20, 21, 22 serves for gassing the reaction vessel and for refilling the latter with another gas such as air, as is required for different experiments.

The stopper 12 is provided with two integral nipples 26, 26'. One of these, 26, is at the uppermost end of the stopper. The other, 26', is somewhat below the upper end of the stopper and projects laterally from the stopper at an angle. These nipples are shaped to receive conventional tubing. The capillary 16 extends axially through the nipple 26 and opens at its upper end, while the other capillary 16 extends axially through the nipple 26' and opens at its outer end.

As has been previously stated, the manometer, except the uppermost end thereof, which contains the collecting enlargement 6', and the stopper 12, except the nipples 26 and 26', may be submerged in the bath. Thus, it will be seen that the entire gas space of the reaction system is positioned within the constant temperature bath and therefore is uninfluenced by ambient fluctuations in temperature.

The manometer and the shaft 5' are supported in the bracket 23, which may be mounted by means of the post 23' on a conventional shaking apparatus, to be supported above the bottom 24 of the bath. A gauge marker 25 may be provided in the bath to indicate a level to which the bath may be filled consistently.

While the invention has been described in connection with a specific embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. Apparatus, including a manometer, for measuring pressure in a reaction vessel, characterized by the fact that the manometer and the reaction vessel are connected by a sleeve which has a ground internal bore and by a stopper which has a ground external surface fitting into said bore and which is rotatable therein, said reaction vessel being mounted on the lower end of said sleeve, said sleeve having two angularly-spaced grooves extending longitudinally over a portion of the inside of its bore, and said stopper being provided with two pairs of axially-extending capillary ducts, one pair of said capillary ducts extending to the lower ends of the stopper and opening at their lower ends into the reaction vessel, said one pair of capillary ducts ending at their upper ends at the periphery of stopper and opposite said grooves, the other said pair of said capillary ducts ending at their lower ends at the periphery of said stopper and opposite said grooves, whereby said grooves may connect said two pairs of capillary ducts in one position of rotary adjustment of said stopper, said stopper having two diverging mouth pieces along its height and the ducts of said other pair of capillary ducts extending to the ends of said mouthpieces.

2. Apparatus according to claim 1 in which the manometer is a double-capillary manometer.

3. Apparatus according to claim 1 in which the sleeve is integral with the manometer.

4. Apparatus according to claim 1 in which the stopper is provided at its lower end with a cup which extends into said reaction vessel.

5. A reaction vessel assembly for submergence in a liquid bath comprising a sleeve having a tapered internal bore, means to support said sleeve in said bath, a reaction vessel mounted on the lower end of said sleeve in communication with the bore of said sleeve, a stopper having a tapered surface to engage said tapered bore in fluid-tight relation, said tapered bore having a pair of diametrically opposed channels formed therein that extend longitudinally over an intermediate portion of said bore, a pair of separate passages extending axially from the lower face of said stopper upwardly and opening respectively into a pair of diametrically opposite radial passages, each positioned to open into a separate one of said channels at one orientation of said stopper in said sleeve, and means to connect each channel separately to the atmosphere.

6. A reaction vessel assembly for submergence in a liquid bath comprising a sleeve having a tapered internal bore, means to support said sleeve in said bath, a reaction vessel mounted on the lower end of said sleeve in communication with the bore of said sleeve, a stopper rotatably mounted in said sleeve and having a tapered surface adjacent its lower end engaging in said tapered bore in fluid-tight relation, said sleeve having formed therein in said bore a pair of channels that extend longitudinally over an intermediate portion of said bore, a pair of passages extending axially in said stopper from the lower face of said stopper in communication with said reaction vessel upwardly and each radially directed at its upper end to open into a separate one of said channels at one orientation of said stopper in said sleeve, means adapted to connect each channel separately to the atmosphere above liquid level, and a basin suspended in said reaction vessel from the lower face of said stopper.

7. A reaction vessel for submergence in a liquid bath comprising a sleeve having a tapered internal bore, means to support said sleeve in said bath, a reaction vessel mounted on the lower end of said sleeve in communication with the bore of said sleeve, a rod member rotatably mounted in said sleeve and having a tapered surface adjacent its lower end engaging in said tapered bore in fluid-tight relation, said sleeve having formed therein in said bore a pair of angularly-spaced channels that extend longitudinally over an intermediate portion of said bore, a pair of passages extending axially in said rod member from the lower face of said rod member in communication with said reaction vessel upwardly through the lower end of said rod member and opening respectively into a pair of radial passages each positioned to open into a separate one of said channels at one orientation of said rod in said sleeve, said rod member having an upper end including a portion adapted to extend above the level of liquid in said bath, and a pair of passages in said upper end each adapted to open at its lower end into a separate one of said channels to communicate with the said passages in the lower end of said rod at said one orientation of said rod and each opening separately at its upper end in the portion of said rod above the level of liquid in the bath.

8. A reaction vessel for submergence in a liquid bath comprising a sleeve having a tapered internal bore, means to support said sleeve in said bath, a reaction vessel mounted on the lower end of said sleeve in communication with the bore of said sleeve, a rod member rotatably mounted in said sleeve and having a tapered surface adjacent its lower end engaging said tapered bore in fluid-tight relation, said sleeve having formed therein in said bore a pair of diametrically opposed channels that extend longitudinally over an intermediate portion of said bore, a pair of lower passages extending in said rod member axially from the lower face of said rod member upwardly through the said lower end of said rod member and opening respectively into a pair of oppositely directed radial passages each positioned to open into a separate one of said channels at one orientation of said rod member in said sleeve, said rod member having an upper end including a pair of angularly-spaced arms adapted to extend above the level of liquid in said bath, and a pair of passages in said upper end each adapted to open at its lower end into a separate one of said channels to communicate with said lower passages at said one orientation of said rod and each opening separately at its upper end through one of said arms.

9. Apparatus for measuring pressure and for submergence in a constant temperature liquid bath comprising an upright manometer rod having a pair of spaced capillary passages extending axially therethrough from the face of its lower end upwardly, a liquid well mounted at the lower end of said rod to supply liquid to said capillary passages, means to adjust the liquid level in said capillary passages from said well, said rod having a side arm integrally extending therefrom, a sleeve integral with said side arm and having a tapered internal bore, a reaction vessel mounted on the lower end of said sleeve in communication with the bore of said sleeve, a rod member rotatably mounted in said sleeve having a tapered surface adjacent its lower end engaging said tapered bore in fluid-tight relation, said rod member having an end extension below said tapered surface of reduced diameter to form a peripheral clearance opening between said rod member and the wall of said bore, one of said capillary passages extending through said side arm and communicating with said peripheral clearance opening, said manometer rod having a portion extending upwardly above the level of said liquid, the second capillary passage in said manometer rod opening into the atmosphere from said upwardly extending portion above the level of liquid in the bath, said sleeve having formed therein in said bore a pair of angularly-spaced channels that extend longitudinally over an intermediate portion of said bore, said rod member being formed with a pair of passages extending axially from the lower face thereof upwardly to open respectively into a pair of oppositely directed radial passages each positioned to open into a separarte one of said channels at one orientation of said rod member in said sleeve, and means for connecting each said channel separately to the atmosphere above the level of liquid in the bath.

10. Apparatus for pressure measurement adapted to be submerged in a constant temperature liquid bath comprising an upright manometer rod having a pair of spaced capillary passages extending axially therethrough from the face of its lower end upwardly, a liquid well mounted at the lower end of said rod to supply liquid to said capillary passages, means to adjust the liquid level in said capillary passages from said well, said rod having a side arm integrally extending therefrom, a sleeve integral with said side arm and having a tapered internal bore, a reaction vessel mounted on the lower end of said sleeve in communication with the bore of said sleeve, a rod member rotatably mounted in said sleeve and having a tapered surface adjacent its lower end engaging said tapered bore in fluid-tight relation, said rod member having an end extension below said tapered surface of reduced diameter that forms a peripheral clearance opening between said rod member and the wall of said bore, one of said capillary passages extending through said side arm and communicating with said peripheral clearance opening, said manometer rod having a portion extending upwardly above the level of the level of liquid in the bath, the second capillary passage opening into the atmosphere in said upwardly extending portion above the level of liquid in said bath, said sleeve having formed therein in said bore a pair of angularly spaced channels that extend longitudinally over an intermediate portion of said bore, said rod member being formed with a pair of passages extending axially from the lower face thereof upwardly to open respectively into a pair of oppositely directed radial passages, each positioned to open into a separate one of said channels at one orientation of said rod member in said sleeve, said rod member having an upper end including a pair of arms adapted to extend above liquid level, and a pair of passages in said upper end each adapted to open at its lower end into a separate one of said channels to communicate with the said passages in the lower end of said rod member at said one orientation of said rod member in said socket and each opening separately at its upper end through one of said arms above the level of liquid in the bath.

References Cited in the file of this patent

UNITED STATES PATENTS

| | | |
|---|---|---|
| 2,703,014 | Koelle | Mar. 1, 1955 |

FOREIGN PATENTS

| | | |
|---|---|---|
| 206,399 | Germany | Feb. 1, 1909 |
| 802,039 | France | May 30, 1936 |
| 367,962 | Italy | Feb. 7, 1939 |